US009654578B2

(12) United States Patent
Joo et al.

(10) Patent No.: US 9,654,578 B2
(45) Date of Patent: May 16, 2017

(54) METHOD AND APPARATUS FOR TAGGING MULTIMEDIA DATA (71) Applicant: Samsung Electronics Co., Ltd, Gyeonggi-do (KR)

(72) Inventors: Jongsung Joo, Seoul (KR); Huichul Yang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 500 days.

(21) Appl. No.: 14/029,662

(22) Filed: Sep. 17, 2013

(65) Prior Publication Data

US 2014/0082143 A1 Mar. 20, 2014

(30) Foreign Application Priority Data

Sep. 17, 2012 (KR) ........................ 10-2012-0102564

(51) Int. Cl.
*G06F 15/16* (2006.01)
*H04L 29/08* (2006.01)
*G06F 17/30* (2006.01)
*H04L 29/06* (2006.01)

(52) U.S. Cl.
CPC .... *H04L 67/2804* (2013.01); *G06F 17/30038* (2013.01); *G06F 17/30265* (2013.01); *G06F 17/30047* (2013.01); *H04L 65/403* (2013.01)

(58) Field of Classification Search
CPC .......... H04L 67/2804; G06F 17/30038; G06F 17/30817
USPC ................................................ 709/218, 217
See application file for complete search history.

(56) References Cited

U.S. PATENT DOCUMENTS

| | | | |
|---|---|---|---|
| 2008/0235275 A1 | 9/2008 | Tanaka et al. | |
| 2009/0006368 A1* | 1/2009 | Mei ................... | G06F 17/30796 |
| 2009/0212923 A1 | 8/2009 | Tokashiki et al. | |
| 2010/0030578 A1* | 2/2010 | Siddique ........... | G06Q 10/0637 |
| | | | 705/3 |
| 2010/0082575 A1 | 4/2010 | Walker et al. | |
| 2010/0260421 A1 | 10/2010 | Park et al. | |
| 2012/0114199 A1 | 5/2012 | Panyam et al. | |
| 2012/0206566 A1* | 8/2012 | Fedoseyeva ..... | G06Q 10/06398 |
| | | | 348/38 |
| 2013/0332250 A1* | 12/2013 | Armaly ................ | H04N 21/252 |
| | | | 705/14.23 |
| 2013/0336628 A1* | 12/2013 | Lamb ....................... | H04N 9/79 |
| | | | 386/224 |

FOREIGN PATENT DOCUMENTS

KR 10-2009-0035501 4/2009

OTHER PUBLICATIONS

Extended European Search Report dated Dec. 16, 2013 in connection with International Patent Application No. 13184860.8, 6 pages.

* cited by examiner

Primary Examiner — Kristie Shingles (57) ABSTRACT

A method and apparatus tag multimedia data with a related comment. In the method, the apparatus receives a request for uploading or downloading the multimedia data, and checks whether there is at least one related comment linked to the multimedia data. Then, the apparatus automatically tags the at least one related comment to the multimedia data if there is the at least one related comment, and uploads or downloads the multimedia data tagged with the at least one related comment.

22 Claims, 5 Drawing Sheets

METHOD AND APPARATUS FOR TAGGING MULTIMEDIA DATA

CROSS-REFERENCE TO RELATED APPLICATION(S) AND CLAIM OF PRIORITY

The present application is related to and claims the benefit under 35 U.S.C. §119(a) of a Korean Patent Application filed on Sep. 17, 2012 in the Korean Intellectual Property Office and assigned Serial No. 10-2012-0102564, the entire disclosure of which is hereby incorporated by reference.

TECHNICAL FIELD

The present disclosure relates to multimedia data processing and, more particularly, to a method and an apparatus for automatically tagging multimedia data with a related comment when the multimedia data is uploaded to or downloaded from a website.

BACKGROUND

Mobile devices are popular due to their inherent portability and multi-functionality. Mobile devices offer a user a variety of functions such as a communication function, a still camera or video camera function, a broadcast receiver function, an Internet access function, and the like.

Meanwhile, some mobile devices provide a search function. Typically the mobile device provides a search function using a file name. However, such a typical search technique has a drawback in that it is difficult to obtain desired results according to types of file name. For example, if a photo file is not named by a user, but automatically named by the system (e.g., as a corresponding date or a predefined expression with increasing numbers), it is very difficult for a user to find a desired photo file.

Recently another search technique using metadata of files has been proposed. However, metadata has only information produced by the system such as a file size, resolution, shooting time, weather, and the like. Namely, a search based on metadata still has difficulty in finding a meaningful file for a user. Thus, there is a need to easily find a desired file, especially meaningful to a user.

SUMMARY

To address the above-discussed deficiencies, embodiments of the present disclosure provide a technique to search for a related comment linked to multimedia data and to tag the related comment to the multimedia data when there is a request for downloading or uploading the multimedia data.

Certain embodiments of the present disclosure allow a user to easily find desired multimedia data on the basis of related data (e.g. comment) tagged to the multimedia data.

Certain embodiments of the present disclosure provide a method for tagging multimedia data. The method includes: receiving a request for uploading or downloading the multimedia data; determining whether there is at least one related comment linked to the multimedia data; if there is the at least one related comment, automatically tagging the at least one related comment to the multimedia data; and uploading or downloading the multimedia data tagged with the at least one related comment.

Certain embodiments of the present disclosure include an apparatus for tagging multimedia data, the apparatus comprising: an input unit configured to receive a request for uploading or downloading the multimedia data; and a control unit configured to check whether there is at least one related comment linked to the multimedia data, to automatically tag the at least one related comment to the multimedia data if there is the at least one related comment, and to upload or download the multimedia data tagged with the at least one related comment.

As described above, the method and apparatus automatically tag a related comment to multimedia data when the multimedia data is uploaded or downloaded. Namely, by automatically tagging metadata of the multimedia data with meaningful information inputted by a user, it is easy to search for desired multimedia data through a unified search (i.e., metadata search).

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 5C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged mobile electronic device.

Non-limiting embodiments of the present disclosure will now be described more particularly with reference to the accompanying drawings. Embodiments of this disclosure may, however, include many different forms and should not be construed as limited to the embodiments set forth herein. Rather, the disclosed embodiments are provided so that this disclosure will be thorough and complete, and will convey the scope of the disclosure to those skilled in the art. The principles and features of this disclosure may be employed in varied and numerous embodiments without departing from the scope of the disclosure.

Furthermore, well known or widely used techniques, elements, structures, and processes may not be described or illustrated in detail to avoid obscuring the essence of the present disclosure. Although the drawings represent embodiments of the disclosure, the drawings are not necessarily to scale and certain features may be exaggerated or omitted in order to better illustrate and explain the present invention.

Figure 1:
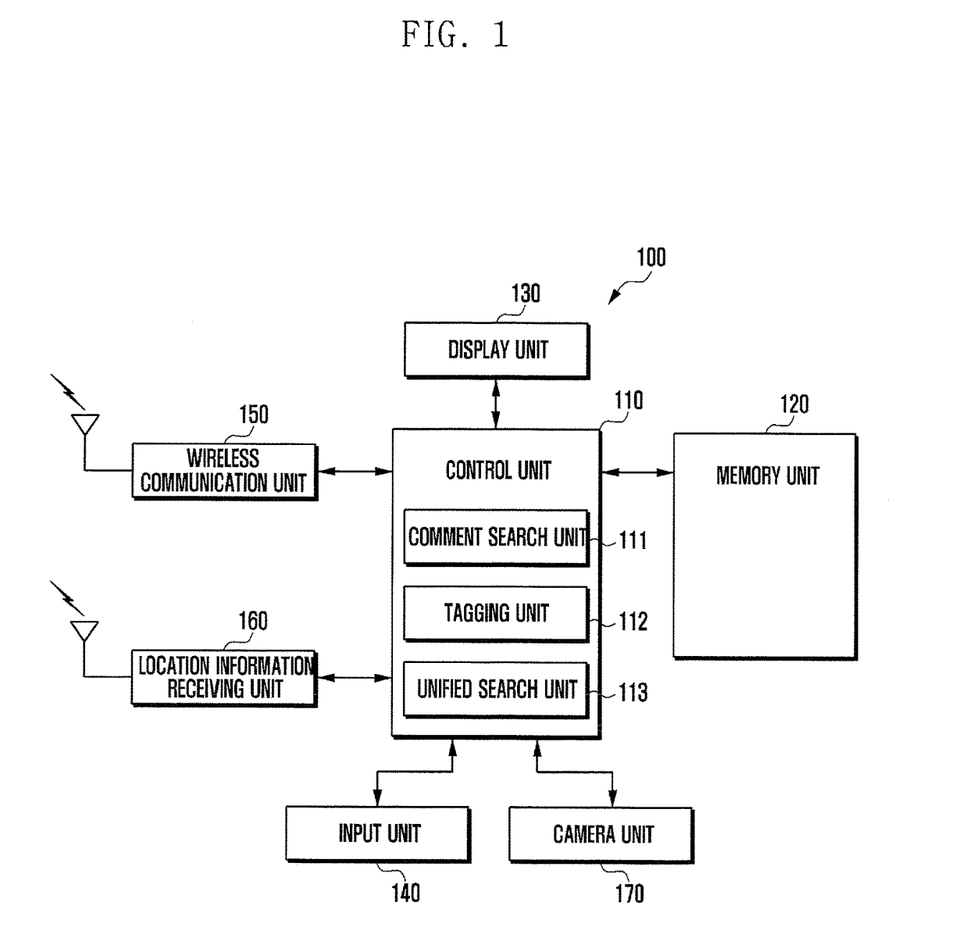
FIG. 1 illustrates a mobile device in accordance with an embodiment of the disclosure.

FIG. 1 illustrates a mobile device in accordance with embodiments of the present disclosure.

Referring to FIG. 1, the mobile device 100 includes a camera unit 170, a location information receiving unit 160, a wireless communication unit 150, an input unit 140, a display unit 130, a memory unit 120, and a control unit 110. Additionally, the control unit 110 includes a comment search unit 111, a tagging unit 112, and a unified search unit 113.

The camera unit 170 is a device that captures a subject as optical images, converts the captured optical images into electric signals, and stores the converted electric signals as digital data. In certain embodiments, the camera unit 170 includes a CMOS (Complementary Metal Oxide Semiconductor) image sensor or a CCD (Charge Coupled Device) image sensor. The camera unit 170 provides a still camera function and a video camera function.

The location information receiving unit 160 measures the location of the mobile device 100. The location information receiving unit 160 receives location information from a satellite navigation system such as Global Positioning System (GPS), Global Navigation Satellite System (GNSS), Quasi-Zenith Satellite System (QZSS), Galileo, or the like. Such location information is saved as metadata when a photo file is created.

The wireless communication unit 150 provides a wireless communication function of the mobile device 100 and, in case where the mobile device 100 supports a mobile communication function, includes a mobile communication module. The wireless communication unit 150 includes a radio frequency (RF) transmitter to up-convert the frequency of a transmitted signal and to amplify the transmitted signal, and an RF receiver to perform low noise amplification to a received signal and to down-convert the frequency of the received signal. Particularly, the wireless communication unit 150 can transmit or receive multimedia data tagged with a related comment to or from a website.

A website can include a blog, a homepage, a community site, a social network service (SNS) site, or the like that allows upload or download of multimedia data. This multimedia data refers to content capable of being tagged, such as an image file (e.g., a photo file), a video file, a music file, and the like. A related comment is data linked to multimedia data and is also referred to as a caption, a tag, a memo, a reply, etc. inputted by a user when or after multimedia data is saved. Alternatively or additionally, a related comment can include an alias (e.g., a building name, a shop name, etc.) inputted by a user rather than systematic location information (i.e., latitude, longitude, etc.) received through the location information receiving unit 160.

The input unit 140 can include a plurality of input keys and function keys for entering numerical or literal information and for setting various functions of the mobile device 100. The function keys can include navigation keys, side keys, hot keys, etc., which are defined to perform specific functions. The input unit 140 creates key signals associated with user settings and function controls of the mobile device 100 and transmits the created key signals to the control unit 110. The input unit 140 include one or a combination of a qwerty keypad, a 3×4 keypad, a 4×3 keypad, a ball joystick, an optical joystick, a wheel key, a touch key, a touch pad, a touch-screen, and the like. In certain embodiments, the mobile device 100 supports a full touch screen, and the input unit 140 may include only function keys, such as a volume key, a screen on/off key, and a power on/off key, formed at a lateral side of the mobile device 100. Particularly, the input unit 140 creates a variety of input signals such as an input signal for uploading or downloading multimedia data to or from a website, an input signal for entering a comment related to multimedia data, an input signal for entering a keyword for a unified search, and the like, and then deliver them to the control unit 110.

The display unit 130 displays information that is input by or provided to a user, including a variety of menus of the mobile device 100. Namely, the display unit 130 provides a variety of screens in connection with use of the mobile device 100, for example, a home screen, a menu screen, a message writing screen, a phonebook screen, a webpage screen, and the like. The display unit 130 can include a liquid crystal display (LCD), organic light emitted diode (OLED), or its equivalent. Particularly, under the control of the control unit 110, the display unit 130 provides a screen for controlling an upload or download of multimedia data, a screen for controlling a unified search, and the like. A detailed description of these screens is provided below with reference to FIGS. 3A to 3C and 5A to 5C.

The memory unit 120 stores the operating system (OS) of the mobile device 100, applications required for performing optional functions of the mobile device 100, such as an audio playback, an image view, a video play, or a broadcast play, user data, and communication data to be transmitted or to have been received. Particularly, the memory unit 120 stores multimedia data which is tagged with a related comment as metadata. For example, multimedia data can include a photo file registered in a SNS site, and a related comment can include a reply written by a user or a visitor.

Additionally, the memory unit 120 stores a tagging program which controls a tagging of a related comment in an upload or download of multimedia data. This tagging program includes a routine to detect a request for an upload or download of selected multimedia data and then to search for at least one related comment linked to the requested multimedia data, a routine to tag the related comment to the requested multimedia data, a routine to check whether a search keyword is contained in tagging information of multimedia data in a unified search process, a routine to display search results, and the like.

The control unit 110 controls the general operation of the mobile device 100 and signal flows between internal blocks of the mobile device 100, and also perform a data processing function. The control unit 110 can be a central processing unit (CPU), an application processor (AP), or the like. Particularly, the control unit 110 controls a process of tagging a related comment to multimedia data in an upload or download of multimedia data. Also, the control unit 110 receives a request for uploading or downloading multimedia data when the mobile device 100 accesses a website that provides at least one of the following functions: uploading and downloading multimedia data. And also, the control unit 110 controls a unified search process regarding data stored in the mobile device 100. To this end, the control unit 110 includes a comment search unit 111, a tagging unit 112 and a unified search unit 113.

The comment search unit 111 searches for a related comment to be tagged to multimedia data in response to a request for downloading or uploading the multimedia data. This related comment can include a caption, a tag, a memo, a reply, and the like inputted by a user when or after multimedia data is saved. Namely, if a request for an upload or download of multimedia data is detected, the comment search unit 111 performs a search to determine whether there is a caption, a tag, a memo, a reply, or the like which is inputted by a user or a visitor and is linked to multimedia data. For example, if a request for downloading a photo file registered in an SNS site is detected, the comment search unit 111 searches for a reply attached to the requested photo file, extract the reply, and transmit the extracted reply to the tagging unit 112.

For example, a related comment can include location information, which may not be geographic coordinates such as latitude and longitude, but may be an alias (e.g., a building name, a shop name, etc.). For example, if a user takes a picture at the region 'A', typically latitudinal and longitudinal information about the region 'A' is stored. However, in this disclosure, an alias such as the name of the region 'A' or the name of a building located in the region 'A' is stored as location information. To this end, the comment search unit 111 transmits latitudinal and longitudinal information measured by the location information receiving unit 160 to a website for providing a location-based service (LBS), and then receive a corresponding alias of the measured location from the website. Such alias may be updated through users and an operator of the website. If the memory unit 120 stores a name (or alias) database, the comment search unit 111 searches the name (or alias) database to find a corresponding alias.

The tagging unit 112 tags a reply received from the comment search unit 111 to corresponding multimedia data. For example, the tagging unit 112 tags a reply as metadata such that desired multimedia data can be easily found in a unified search process using metadata.

The unified search unit 113 provides a unified search for data stored in the mobile device 100. In certain embodiments, the unified search unit 113 provides a unified search based on metadata. That is, if a keyword is input in a unified search mode and then a search request is received, the unified search unit 113 finds all files (e.g., contact items, text messages, photo files, video files, etc.) having metadata in which the inputted keyword is contained. Particularly, the unified search unit 113 searches for multimedia data tagged with a related comment.

Although not illustrated in FIG. 1, certain embodiments of the mobile device 100 selectively further includes elements for providing additional functions, such as a broadcast receiving module, a digital sound playback module, a motion sensor module, and the like. According to digital convergence trends today, such elements can be varied, modified and improved in various ways, and any other elements equivalent to the above elements can be additionally or alternatively equipped in the mobile device 100. Meanwhile, as will be understood by those skilled in the art, some of the above-mentioned elements in the mobile device 100 may be omitted or replaced with another.

Figure 2:
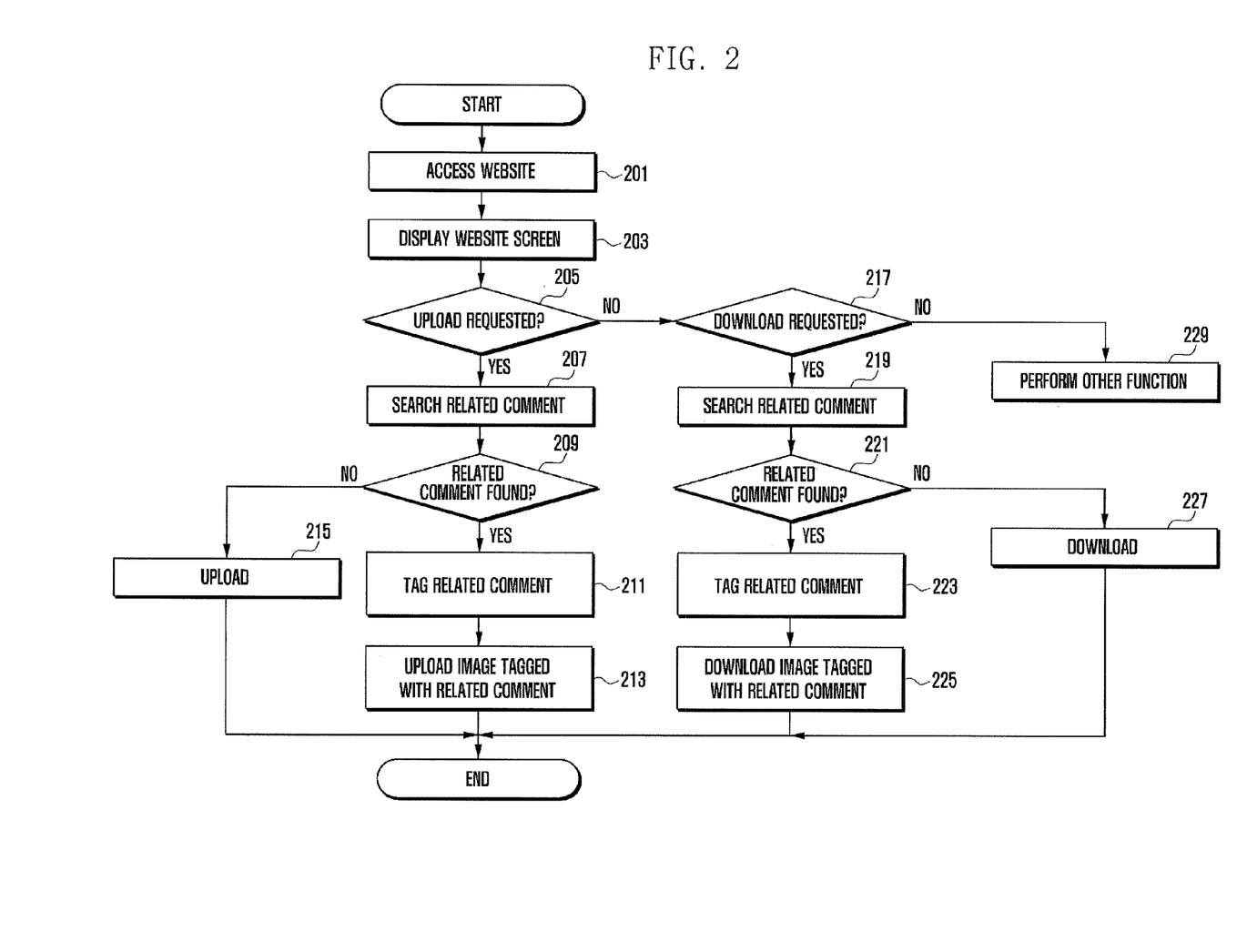
FIG. 2 illustrates a method for tagging multimedia data in accordance with embodiments of the present disclosure.
Figure 3A:
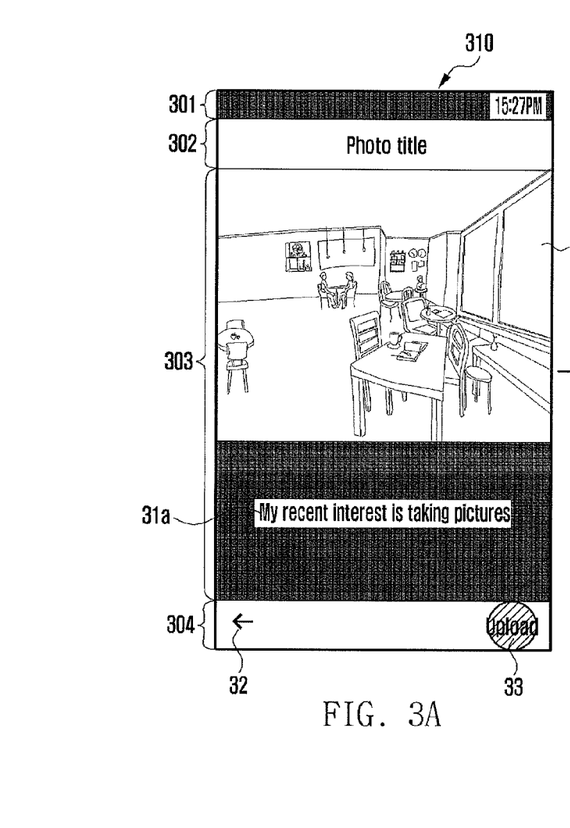
FIGS. 3A, 3B, and 3C illustrate screenshots in connection with a tagging method for multimedia data in accordance with embodiments of the present disclosure.
Figure 3B:
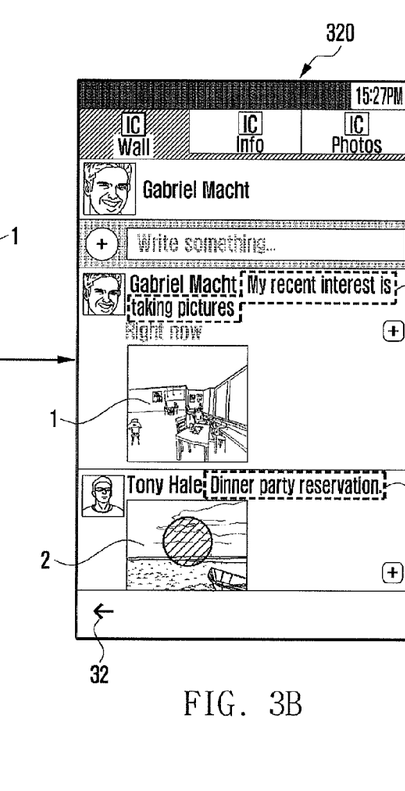
Figure 3C:
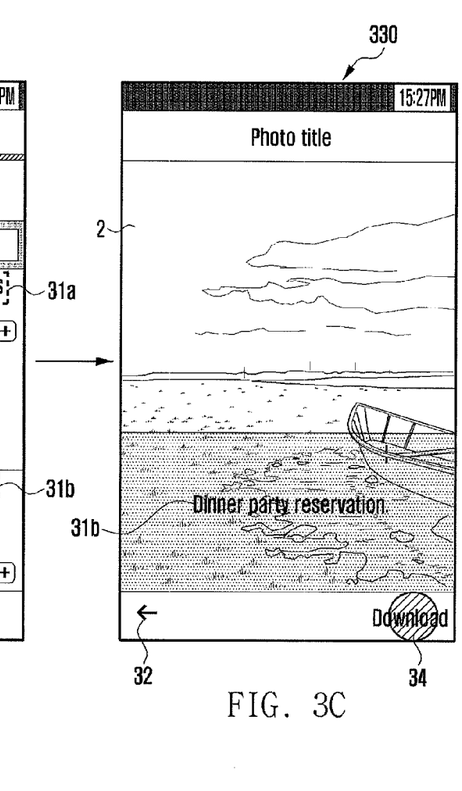

FIG. 2 illustrates a method for tagging multimedia data in accordance with embodiments of the present disclosure, and FIGS. 3A-3C illustrate screenshots in connection with a tagging method for multimedia data in accordance with embodiments of the present disclosure.

Referring to FIGS. 1 to 3C, at block 201, the control unit 110 accesses a website, which provides functions to upload or download multimedia data through the wireless communication unit 150. At block 203, the control unit 110 controls the display unit 130 to display a screen of the accessed website. A website can include a blog, a homepage, a community site, a social network service (SNS) site, or the like that allows upload or download of multimedia data. Multimedia data refers to content capable of being tagged, such as an image file (e.g. a photo file), a video file, a music file, and the like.

At block 205, the control unit 110 determines whether there is a request for uploading multimedia data. To this end, although not illustrated in FIG. 3A to 3C, the control unit 110 outputs, in advance, a list of photo files stored in the memory unit 120 of the mobile device 100 at user's request, and then receives a selection of a specific photo file to be uploaded to the website in the list. Alternatively, the control unit 110 executes, in advance, the camera unit 170 to take a photo or record a video.

A request for an upload occurs when an upload menu item is selected on an upload screen. Referring to a screenshot 310 in FIG. 3A, a multimedia data upload screen contains an indicator region 301, a multimedia data title region 302, a content display region 303, and a menu region 304. The menu region 304 includes a back menu item 32 corresponding with instructions to return to a previous state, and an upload menu item 33 corresponding with instructions to upload. In this screenshot 310, multimedia data is a certain photo file 1 having a related comment 31a that has been already input by a user. In this case, if the photo file 1 has a landscape mode as shown in a screenshot 310, the related comment 31a may be separated from and disposed under the photo file 1. Alternatively, if a photo file 2 has a portrait mode as shown in a screenshot 330 of FIG. 3C, a related comment 31b may be overlapped with or disposed in the photo file 2. This is, however, an example only and not to be considered as a limitation on the position of a related comment.

When there is a request for uploading multimedia data at block 205, the control unit 110 searches for a related comment at block 207 and then determines at block 209 whether there is a related comment. As discussed above, examples of a related comment include a caption, a tag, a memo, a reply, etc. input by a user when or after multimedia data is saved. Alternatively or additionally, a related comment can include an alias (e.g., a building name, a shop name, etc.) input by a user rather than systematic location information (i.e., latitude, longitude, etc.) received through the location information receiving unit 160. The memory unit 120 stores the name (or alias) in a database. Alternatively, using location information contained in multimedia data during an upload of the multimedia data, the control unit 110 searches for a name (or alias) of corresponding location from a website (e.g., www.foursquare.com) which offers a location based service.

If there is no related comment at block 209, the control unit 110 uploads the multimedia data to the website without tagging at block 215. In contrast, if there is a related comment, the control unit 110 tags the related comment to the multimedia data at block 211, and uploads the multimedia data tagged with the related comment to the website at block 213. For example, as shown in a screenshot 320 in FIG. 3B, the control unit 110 uploads the photo file 1 as a posting of the website. At this time, the control unit 110 registers the posting having the uploaded photo file 1 at the top of a list. Also, the control unit 110 registers the posting entitled with the name of the writer, 'Gabriel Macht', and a previous related comment 31a, 'My recent interest is taking pictures'.

If there is no request for an upload, the control unit 110 determines at block 217 whether there is a request for a download. For example, as shown in a screenshot 320 in FIG. 3B, when a photo file 2 contained in a certain posting is selected (e.g., touched), the control unit 110 enlarges the selected photo file 2 as shown in a screenshot 330 of FIG. 3C. The enlarged photo file 2 contains in part a comment 31b, 'Dinner party reservation', inputted by a user, 'Tony Hale'. In certain embodiments, a user requests a download of the selected photo file 2 by touching a download menu item 34. Alternatively, in screenshots 320 and 330, a user may click with the right button of a mouse or long touch on a photo file to be downloaded. In response to a user click or touch on the photo file to be downloaded, a pop-up menu showing executable functions is displayed, enabling that a user may select a download function in the pop-up menu.

If there is no request for a download at block 217, the control unit 110 performs any other selected function at block 229. For example, the control unit 110 performs a search mode described below, or controls modification of a posting, writing of a comment, or the like. If there is a request for a download at block 217, the control unit 110 searches for, at block 219, a comment related to multimedia data to be downloaded, and determine at block 221 whether there is a related comment.

If there is a related comment at block 221, the control unit 110 tags the related comment to the multimedia data at block 223, and then downloads the multimedia data tagged with the related comment from the website at block 225. If there is no related comment at block 221, the control unit 110 downloads the multimedia data without tagging at block 227.

Figure 4:
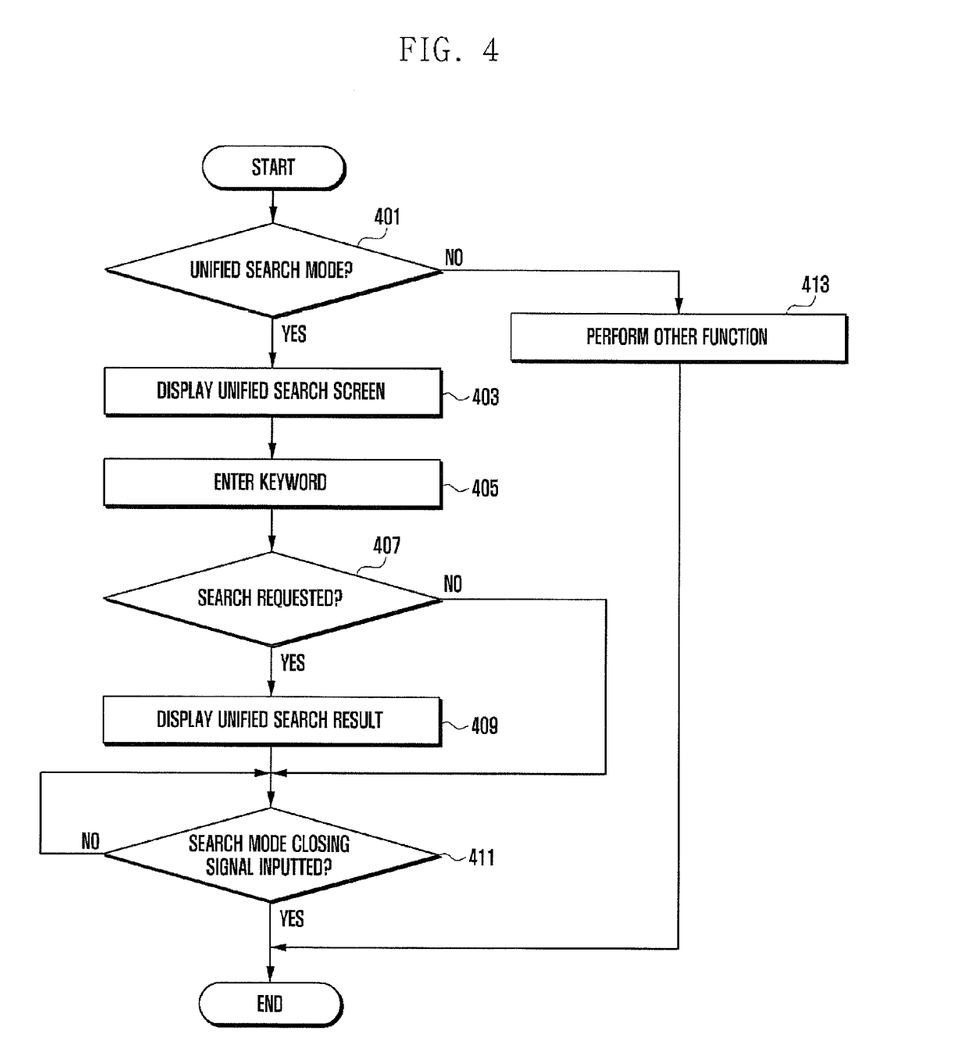
FIG. 4 illustrates a method for searching for multimedia data in accordance with embodiments of the present disclosure.
Figure 5A:
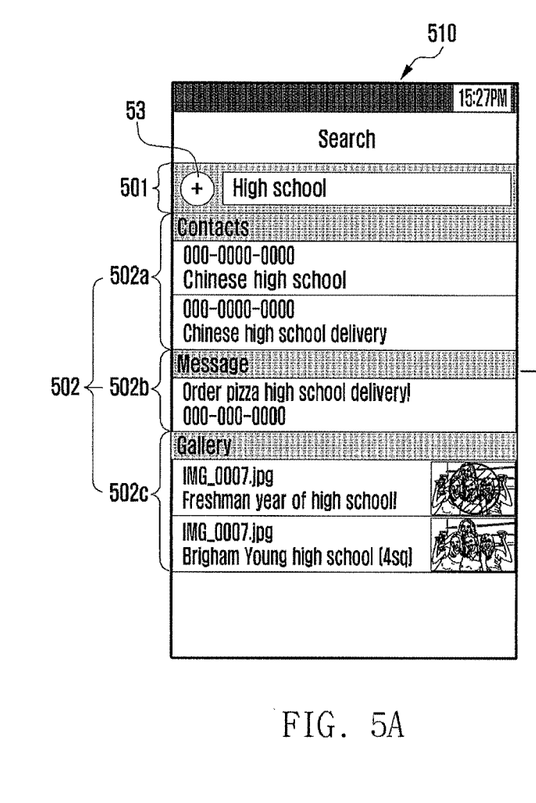
FIGS. 5A, 5B, and 5C illustrate screenshots in connection with a search method for multimedia data in accordance with embodiments of the present disclosure.
Figures 5B, 5C:
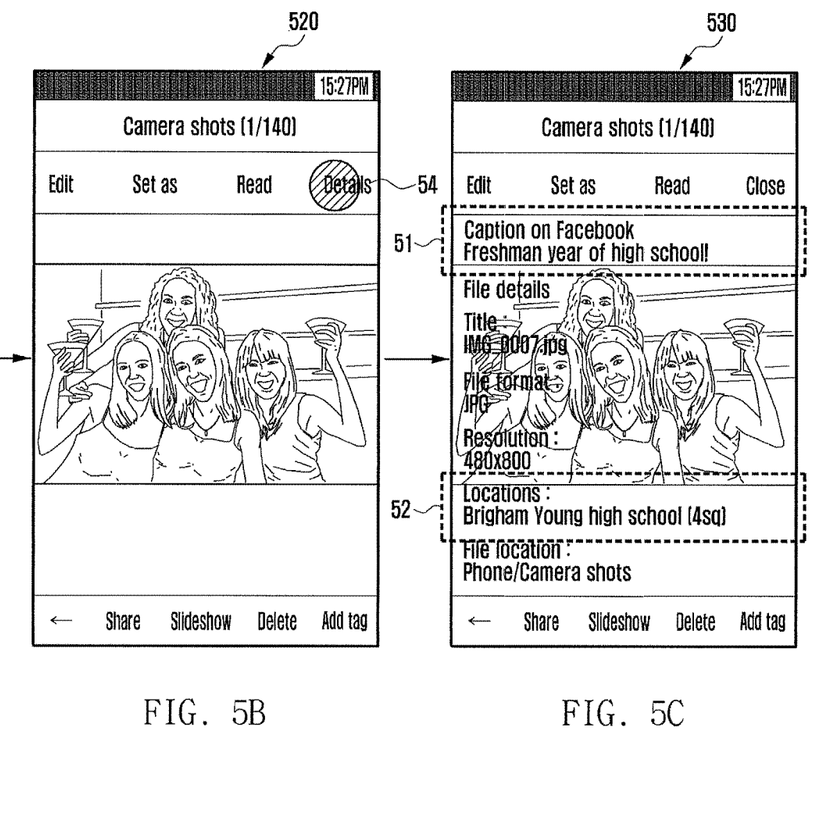

FIG. 4 illustrates a method for searching for multimedia data in accordance with embodiments of the present disclosure, and FIGS. 5A, 5B, and 5C shows screenshots in connection with a search method for multimedia data in accordance with embodiments of the present disclosure.

Referring to FIGS. 1 to 5C, the control unit 110 determines at block 401 whether a unified search mode is performed. If a unified search mode is not performed, the control unit 110 performs any other selected function at block 413. For example, the control unit 110 performs a function such as playing music, a camera, or the like, or maintain an idle mode. Alternatively, the control unit 110 performs an upload or download function for multimedia data which has been described with reference to FIGS. 2, 3A, 3B, and 3C.

If a unified search mode is performed at block 401, the control unit 110 displays a unified search screen at block 403. Then the control unit 110 detects an input of a keyword at block 405 and determines at block 407 whether a request for a search is received. If no request for a search is received at block 407, the control unit 110 returns to and performs the function of block 411. If a request for a search is received at block 407, the control unit 110 controls display unit 130 to display a unified search result on a screen at block 409.

Referring to a screenshot 510 in FIG. 5A, a unified search result screen contains a keyword input region 501 and a search result display region 502. The keyword input region 501 includes a keyword add menu item 53, and also displays a previous keyword, e.g., 'high school', until a new keyword is input. In certain embodiments, the search result display region 502 separately displays search results according to their categories. For example, as shown in screenshot 510, the control unit 110 classifies search results into contacts, messages and images, and then separately displays each in a contact section 502a, a message section 502b, and a gallery section 502c, respectively. This example shows that data containing a keyword is found only in contacts, messages, and images. If there is a music file containing a keyword, 'high school', the search result display region 502 further includes a music section for arranging music files. Meanwhile, as shown in a screenshot 510, images are found and arranged as search results in the gallery section 502c. A search for image files becomes possible because a keyword, 'high school' has been tagged to such images. A lack of related comments causes a failure in searching for desired images. That is, a mobile device that adopts a typical search technique fails to display the gallery section 502c in the search result display region 502.

Returning to FIG. 4, at block 411, the control unit 110 determines whether a search mode closing signal is inputted. If so, the control unit 110 ends a search mode and returns to an idle mode. If a search mode is not ended, the control unit 110 remains at block 411.

Meanwhile, although not illustrated in FIG. 4, the control unit 110 determines whether one of multimedia the data is selected in the search result display screen, and if selected, enlarges the selected multimedia data. For example, if one of images arranged in the gallery section 502c of a screenshot 510 is touched, the control unit 110 enlarges the selected image as shown in a screenshot 520 of FIG. 5B. Then, if a details menu item 54 is selected in a screenshot 520, the control unit 110 displays detailed information of the selected image in overlay form on the screen as shown in a screenshot 530 of FIG. 5C. This detailed information can include metadata. Also, such detailed information can include a caption field 51 and a locations field 52 in which the inputted keyword, 'high school' is contained. Particularly, the caption field 51 is a unique field that is not found in any typical search technique. Additionally, the locations field 52 is tagged with an alias of location rather than typical latitudinal and longitudinal information.

As fully discussed above, this disclosure provides a technique to automatically tag a related comment (e.g., a caption, a tag, a memo, a reply, etc.) to multimedia data when the multimedia data is downloaded or uploaded. This technique allows a user to easily find desired multimedia data in a unified search process.

The above-discussed method for tagging multimedia data with a related comment in embodiments of this disclosure can be implemented as program commands that can be written to a computer-readable recording medium and can thus be read by various computer-aided means. Such a computer-readable recording medium can include program commands, a data file, a data structure, etc. alone or in combination. Program commands written on the computer-readable recording medium can be designed and configured specially for the present disclosure or known to those skilled in the art of computer software. Such a computer-readable recording medium can be any type of recording device in which data can be stored in a computer-readable manner. Examples of a computer-readable recording medium include a magnetic medium such as a hard disk, a floppy disk, and a magnetic tape, an optical medium such as a Compact Disc (CD)-Read Only Memory (ROM) or a Digital Versatile Disc (DVD), a magneto-optical medium such as a floptical disk, a hardware device configured specially to store and execute program commands such as a ROM, a Random Access Memory (RAM), and a flash memory. Examples of a program command include a high-level language code that can be executed in a computer by means of an interpreter as well as a machine language code such as created by a compiler. The hardware device can be configured to operate as one or more software modules to perform operations of the present disclosure, and vice versa.

Although the present disclosure has been described with examples, various changes and modifications may be suggested to one skilled in the art. It is intended that the present disclosure encompass such changes and modifications as fall within the scope of the appended claims.

What is claimed is:

1. A method for tagging multimedia data, the method comprising:
   receiving a request for one of uploading the multimedia data or downloading the multimedia data;
   searching, in response to the request, for at least one related comment that is linked, but not tagged, to the multimedia data;
   in response to the searching for the at least one related comment that is linked, but not tagged, to the multimedia data, automatically tagging the at least one related comment to the multimedia data; and
   in response to the receiving the request for uploading the multimedia data, uploading the multimedia data tagged with the at least one related comment;
   in response to the receiving the request for downloading the multimedia data, downloading the multimedia data tagged with the at least one related comment; and
   wherein if one of the multimedia data tagged automatically with the at least one related comment is selected, the selected multimedia data is enlarged.

2. The method of claim 1, wherein automatically tagging includes tagging the at least one related comment as metadata of the multimedia data.

3. The method of claim 1, wherein receiving the request includes:
   accessing a website; and
   receiving one of:
      a request for uploading the multimedia data to the accessed website, and
      a request for downloading the multimedia from the accessed website.

4. The method of claim 3, wherein the website includes at least one of a blog, a homepage, a community site, or a social network service (SNS) site.

5. The method of claim 1, wherein the multimedia data includes at least one of an image file, a video file, or a music file.

6. The method of claim 1, wherein the at least one related comment includes at least one of a tag, a caption, a reply, a memo, or an alias corresponding to a location.

7. The method of claim 1, further comprising:
   detecting execution of a unified search mode;
   receiving a keyword inputted to search for the multimedia data;
   performing a unified search to find at least one multimedia data which has the keyword as metadata; and
   outputting search results.

8. The method of claim 1, further comprising:
   performing a unified search to find at least one multimedia data which has as metadata a keyword inputted, and
   controlling a display unit to output search results.

9. The method of claim 1, further comprising:
   in response to receiving an input while the multimedia data is enlarged, overlaying detailed information of the enlarged multimedia data on the enlarged multimedia data.

10. An apparatus for tagging multimedia data, the apparatus comprising:
    an input unit configured to receive a request for one of uploading and downloading the multimedia data; and
    a control unit configured to:
       in response to the request, search for at least one related comment that is linked, but not tagged to the multimedia data,
       in response to the searching for the at least one related comment that is linked, but not tagged to the multimedia data, automatically tag the at least one related comment when the at least one related comment is found, and
       in response to the receiving the request for uploading, upload the multimedia data tagged with the at least one related comment, and
       in response to the receiving the request for downloading, download the multimedia data tagged with the at least one related comment,
    wherein if one of the multimedia data tagged automatically with the at least one related comment is selected, the selected multimedia data is enlarged.

11. The apparatus of claim 10, wherein the control unit is further configured to tag the at least one related comment as metadata of the multimedia data.

12. The apparatus of claim 10, wherein the control unit is further configured to access a website that provides at least one of upload and download functions for the multimedia data, and to receive a request for one of uploading and downloading the multimedia data to or from the accessed website.

13. The apparatus of claim 12, wherein the website includes at least one of a blog, a homepage, a community site, or a social network service (SNS) site.

14. The apparatus of claim 10, wherein the multimedia data includes at least one of an image file, a video file, or a music file.

15. The apparatus of claim 14, further comprising a camera unit configured to capture the multimedia data as one of an image file and a video file.

16. The apparatus of claim 10, wherein the at least one related comment includes at least one of a tag, a caption, a reply, a memo, or an alias corresponding to a location.

17. The apparatus of claim 10, wherein the control unit is further configured to:
    perform a unified search to find at least one multimedia data which has as metadata a keyword inputted, and
    control a display unit to output search results.

18. The apparatus of claim 17, wherein the output search results are displayed within a section of the display unit corresponding to a file type.

19. The apparatus of claim 18, wherein the at least one multimedia data comprises an image file that has the keyword inputted as metadata, and
    wherein the output search results comprises the image file displayed within a gallery section of the display unit, the gallery section corresponding to image files.

20. The apparatus of claim 10, wherein the control unit includes:

a comment search unit configured to search for the at least one related comment;

a tagging unit configured to tag the at least one related comment to the multimedia data; and a unified search unit configured to support a unified search based on metadata in a unified search mode.

21. The apparatus of claim 10, further comprising:

a location information receiving unit configured to receive location information; and a wireless communication unit configured to support a wireless communication function, wherein the control unit is further configured to control the wireless communication unit to transmit the received location information to a website for providing a location based service, and to receive an alias corresponding to the location information from the website.

22. The apparatus of claim 10, wherein the control unit is further configured to:

in response to receiving an input while the multimedia data is enlarged, overlay detailed information of the enlarged multimedia data on the enlarged multimedia data.

\* \* \* \* \*